Patented Mar. 16, 1948

2,438,018

UNITED STATES PATENT OFFICE 2,438,018

PROCESS FOR TREATING HYDROCARBONS

Alan C. Nixon and David Louis Yabroff, Berkeley, Calif., assignors to Shell Development Company, San Francisco, Calif., a corporation of Delaware No Drawing. Original application October 16, 1943, Serial No. 506,612. Divided and this application June 10, 1946, Serial No. 675,843

10 Claims. (Cl. 196—44)

This invention deals with a method for improving the rate of separation of alkaline treating liquids or solutions from hydrocarbons or of facilitating steam stripping of the resulting fat alkaline solution, if the latter is desired, or both.

It is well known that hydrocarbon oils are mixtures of hydrocarbons and may contain compounds of many different degrees of saturation, such as paraffins, olefins, polyolefins, acetylenes, naphthenes, or aromatics. It is also known that hydrocarbon oils frequently contain weak acids, e. g., acids having dissociation constants below about $10^{-5}$, such as hydrogen sulfide, mercaptans, alkyl phenols, etc. It is often desirable to treat such hydrocarbon mixtures to separate them into hydrocarbons of different degrees of saturation, or to purify particular hydrocarbons, such as benzene, toluene, xylene, butylenes, butadiene, isoprene, ethylene, acetylene, etc.; or to remove weak acids of the type mentioned above from such hydrocarbons or mixtures.

One method of carrying out such a separation or purification is by extracting one or more of the components with an alkaline solution, which has a preferential solvent power for one or more of the components of the mixture, and thereafter separating the resulting alkaline solution from the dissolved portion of the mixture. The extraction may be either by liquid-liquid or by vapor-liquid contact, including extractive distillation. (In order to achieve separation by extractive distillation the two or more compounds to be separated from one another should as a rule boil not more than about 20° C. apart and preferably not more than about 10° C. apart.) These extractions are normally carried out in apparatus permitting contact of the alkaline treating solution and the mixture containing the hydrocarbons, usually by counter-current flow, either through a packed or a plate column, or through a series of mixers and settlers, whereby two end phases are produced and separated, one of which is an extract comprising the fat alkaline treating solution containing the extracted portion of the mixture, and the other of which is the raffinate portion of the mixture. These two phases may be both liquid or one may be liquid and the other may be a vapor. For reasons of economy, the fat alkaline solution is usually regenerated such as by steam stripping, air blowing or washing with a suitable wash liquid, etc., and the regenerated solution is then re-used for treatment of further quantities of the original mixture.

The mixtures to which this invention is applicable are either normally liquid or normally gaseous and preferably have an end boiling point of below about 200° C. They are comprised of hydrocarbons and must be substantially free from sulfate ester acids, sulfonic acids, or other relatively strong acids because of the effect of these acids upon the alkaline treating solution by permanently poisoning or neutralizing it.

Alkaline treating liquids or solutions which may be employed must be stable and inert so as not to react irreversably with the components of the mixture under the conditions of the process; they must have a greater solvent power for some components than for others; and they must be separable from the dissolved components by physical means such as, by fractional distillation and/or washing-out, either while they are in the form originally absorbed or else after they have been changed chemically by a simple operation such as air oxidation. If employed in liquid extraction, they must be only partially miscible with mixtures to be extracted. They may be aqueous or non-aqueous.

Some specific examples of alkaline treating liquids for the separation of unsaturated hydrocarbons from mixtures containing them are: aniline, methyl aniline, toluidine, etc.; solution of complex salts of univalent heavy metals from groups I and II of the periodic table, such as copper, silver, gold, mercury, etc., chlorides, nitrates, cyanides, acetates, etc., with anhydrous, aqueous, alcoholic, etc., ammonia or lower organic aliphatic primary amines, such as methyl amine, ethyl amine, propyl amine, butyl amine, ethylene diamine, mono-, di-, or tri-ethanolamine or quaternary ammonium bases as tetra methyl, trimethyl benzyl, etc., ammonium bases, etc. In the extraction of weak acids normally associated with petroleum oils, alkaline treating solutions, such as tripotassium phosphate, sodium phenolate, sodium borate, sodium or potassium carbonate, organic bases, such as ethanolamine, diamino propanol, piperidine, etc., or strong solutions of alkaline metal hydroxides, preferably having concentrations of 25 to 50%, or alkaline solutions containing solutizers may be employed.

Solutizers are known as organic substances which when in the liquid state are solvents for weak organic acids, are substantially insoluble in water-immiscible liquids, are soluble in aqueous strong bases, are chemically inert to the action of said bases even at elevated temperatures, and have boiling temperatures preferably substantially higher than water. Solutizers are used to enhance the extractive powers of aqueous alkaline solutions for weak organic acids such as mercaptans and phenols. The solutizer process and the various solutizers have been described in a series of patents and patent applications as well as in the general literature, for example, in the Yabroff et al. U. S. Patents 2,149,379, 2,149,380, 2,152,166, 2,152,720, 2,152,723, 2,164,851, 2,186,398, 2,202,039; applications Serial Numbers 255,684, filed February 10, 1939, now Patent No. 2,223,- 798; 271,962, filed May 5, 1939, now Patent No. 2,229,995; Refiner and Natural Gasoline Manufacture, May 1939, pages 171–176, and March 1940, pages 73–76; Industrial Engineering and Chemistry, volume 32, pages 257–262, February 1940, etc.

In choosing one of the above alkaline treating liquids, sight must not be lost of the boiling temperature requirements relative to the boiling temperature of the mixtures. For example, in vapor-liquid extraction, it is important that the solvent chosen have a boiling temperature higher than that of the mixture to be treated, and in the specific case of extractive distillation, it is desirable that the boiling temperature of the solvent be not less than about 50° C. higher than the boiling temperature of the mixture. Accordingly, the particular treating agent to be employed necessarily depends upon both the boiling temperature of the mixture to be treated, and the type of process to be used in the treatment.

Unfortunately, processes of this type often produce foam and/or emulsions which greatly reduce the maximum throughput of a given treating unit. Emulsions, if formed, occur in liquid-liquid treating, and foaming may occur in vapor-liquid treating. Foaming may also occur if distillation, steam stripping, air blowing etc., is employed as a means for recovering the alkaline treating solution from the extract or raffinate.

The nature of the substances responsible for difficulties is not definitely established. It is believed though, that foam and emulsions are produced by small amounts of impurities, such as compounds related to gasoline gums or similar resinous materials formed by reaction of some of the components of the hydrocarbon mixtures with themselves or with the alkaline treating solution or a component thereof, particularly in the presence of oxygen. In many cases it is impossible to keep air away from such mixtures, since small quantities easily leak through joints of pumps and valves, etc. Thus, most hydrocarbon oils contain small but definite amounts of dissolved oxygen. In the case of treating solutizer solutions with alkaline solutions containing phenolates, a phenol type resin may be formed, for instance, by the interaction of mercaptans, aldehydes or other impurities in the mixture treated.

Accordingly, it is the purpose of this invention t provide means for improving the rate of separation of aqueous alkaline treating liquids from the hydrocarbons which are being treated. Another purpose is simultaneously or independently to reduce the foaming tendency of the treating liquid, for example, when it is being regenerated by steam stripping. Still another purpose is to provide means for preventing the formation of emulsions caused by the presence of emulsifiers in the treating liquids, particularly those containing impurities which readily react to form emulsifiers. It is yet another purpose to provide a remedy for breaking emulsions formed in such treating processes.

It has been discovered that the addition of relatively small amounts of a stable organic surface-active agent which contains at least 8 carbon atoms per molecule and has a molecular weight of below about 1000 (preferably below about 600) and which is dispersible in the alkaline treating liquid, results not only in reducing foaming and in an improved rate of separation, but also in effective and rapid breaking of emulsions which may form between the two phases produced in the process. It is important that the agent be readily and completely dispersed through the treating solution so as to be continuously and evenly effective throughout the entire zone of contact and the surface-active agents used in the process are those which form true solutions in the treating solution or spontaneously form colloidal dispersions therein, i. e. form dispersions of at least colloidal dimensions.

The agents should be reasonably stable toward the action of oxygen in the presence of caustic alkali and at elevated temperatures of steaming if steam regeneration is employed as part of the process.

In a regenerative process wherein the spent treated solution is continuously regenerated and recirculated for further contact with the mixture to be treated, it is desirable that the surface-active agents, in order to be more or less permanently useful, should not be extracted from the treating solution when the latter is contacted with the hydrocarbon mixture. The presence of the agent in either of the separated components of the mixture may be undesirable, as it may interfere with their intended uses. Therefore, the surface-active agents should be substantially insoluble in hydrocarbon oils.

In some cases, it may be desirable to remove these agents from the treating solution in which case they should have a property which makes possible such separation.

The organic surface-active agents of this invention are fatty acids having between 8 and 14 carbon atoms per molecule, and the corresponding alkali and alkali-earth metal salts thereof. These agents are effective to prevent or break both foams and emulsions.

Illustrative examples of the salts of the fatty acids containing between 8 and 14 carbon atoms per molecule and which may be utilized in accordance with this invention are sodium or potassium caprylate, pelargonate, caprate, undecylate, sabinate, laurate, tridecylate, myristate, etc., which salts are effective both as demulsifiers and as defoamers. However, the salts of lower fatty acids, those having less than 8 carbon atoms, and the salts of the higher fatty acids, i. e., those having more than 14 carbon atoms such as stearic acid, are substantially ineffective.

Amounts of the surface-active agents which need to be added to improve the rate of settling or breaking of the emulsion or foam or both, are insufficient to materially affect the action of the treating agent. This amount may vary between about 0.001% and 1%, and preferably between about 0.001% and 0.1% by volume of the treating agent. The different types of treating agents are capable of dissolving different amounts of the surface-active agents and different mixtures may require different amounts to reduce foaming and/or emulsification. This is probably due to the difference in reactivity of the ions of the respective agents and their effect on the hydrocarbon mixtures treated. Therefore, actual laboratory tests within the above limitations may be required to accurately determine the amount of the agent or combination of agents for the most effective separation of the given mixture with a given alkaline treating solution.

It is desirable that the beneficial effect of the salt shall not be restricted to and be dependent on a specific range of concentration substantially narrower than the limits indicated above—that is to say, there should not be a sudden reversal of the beneficial effect, i. e., an increase in the emulsification or foaming tendencies or both, of the extracting solution upon addition of a slight excess of the salt over the optimum quantity. On the contrary, the beneficial effects should extend over substantially the entire range of concentration indicated, and changes in the effects due to deviations from the optimum concentration should be only matters of degree. Many surface-active salts, particularly the ordinary soaps such as sodium stearate, sodium oleate, etc., effect de-emulsification in certain specific amounts. However, when present in slightly larger amounts they increase, rather than decrease, the emulsion tendencies of the extracting solution. For example, sodium stearate in a concentration of 0.06% effectively broke a semi-stable solutizer emulsion, while in 0.08% concentration a stable emulsion remained.

*Example*

An aqueous copper ammonium acetate solution which when fresh had the following composition: 0.25 mol/liter of cupric ions, 2.93 mols/liter of cuprous ions, 10.4 mols/liter of ammonia, and 4.0 mols/liter of acetic acid, was spent by using it to effect the separation of olefinic (diolefinic) hydrocarbons from paraffin hydrocarbons. Samples of this spent solution were subjected to an emulsion test in which they were agitated with an equal amount by volume of tertiary amylenes at a temperature of about 25° F. To two of the samples was added 0.1 and 0.01 gram, respectively, for each 100 cc. of the solvent, of an alkali metal salt of lauric acid. The resulting emulsion was then allowed to settle and the time required for substantially complete separation was noted and whether or not at the end of the settling a residual rag (large globules of hydrocarbon surrounded by thin films of solution) was left at the interface between the solvent phase and the hydrocarbon phase. The results are tabulated in the table below:

| Organic Surface-active Agent | Conc. in g./100 cc. Solvent | Settling Time in Minutes | Vol. of Residual Rag | Remarks |
|---|---|---|---|---|
| Fresh Solution | 0 | 1½ | 0 | No foam. |
| Spent Solution | 0 | 35 | 9 | Stable foam. |
| Spent Solution plus salt of lauric acid | 0.1 | 9 | 0 | No foam. |
| Do | 0.01 | 1 | 5 | Do. |

This application is a true division of the copending application Serial No. 506,612, filed October 16, 1943 issued November 12, 1946, as U. S. Patent No. 2,411,105.

We claim as our invention:

1. In a process for treating a mixture comprising predominately hydrocarbons with an aqueous alkaline treating liquid to effect the separation of components of said mixture which are soluble in the treating liquid from components which are not soluble therein, in which process two phases are produced, a first phase comprising predominately hydrocarbons and a second phase comprising predominately aqueous alkaline treating liquid and at least a substantial portion of components of said mixture which are soluble therein, in which process a relatively stable dispersion of one phase in the other is produced, the improvement comprising the method of reducing the stability of such a dispersion which comprises effecting said treatment in the presence of from about 0.001% to about 1% by volume of said treating liquid of an organic surface-active agent which forms a dispersion itself of particles at least as small as of colloidal dimensions in said aqueous treating liquid, which is substantially insoluble in said mixture and which is a salt of a fatty acid containing between 8 and 14 carbon atoms per molecule.

2. The process of claim 1, wherein said mixture is a gasoline distillate.

3. The process of claim 1, wherein said mixture contains a substantial proportion of $C_4$ diolefines.

4. The process of claim 1, wherein said treating process is a liquid-liquid phase separation process.

5. The process of claim 1, wherein the treating process is a vapor-liquid phase separation process.

6. The process of claim 1, wherein said mixture contains diolefins and said alkaline treating solution is an aqueous copper ammonium acetate solution.

7. The process of claim 1, wherein the amount of the said surface-active agent is between about .001% and .1% by volume of said mixture.

8. The process of claim 1, wherein said surface-active agent is an alkali metal salt of a fatty acid.

9. The process of claim 1, wherein said dispersion is a foam.

10. In a process for contacting a hydrocarbon fraction containing substantial proportions of hydrocarbons with different degrees of saturation and unsaturation with an aqueous copper ammonium acetate solution, whereby two phases are produced, a first phase comprising predominately hydrocarbons of a higher degree of saturation and a second phase comprising predominately said aqueous solution and dissolved therein a substantial proportion of the hydrocarbons of said fraction which have a higher degree of unsaturation, in which process a relatively stable dispersion of one phase in the other is produced by the action of impurities formed as a result of reactions of unsaturates in said mixture with each other and with oxygen, the method of preventing such a dispersion which comprises effecting said treating in the presence of from about 0.001% to about 1% by volume of said aqueous solution of an alkali metal salt of a fatty acid containing from 8 to 14 carbon atoms per molecule, which salt is dispersible in said aqueous copper ammonium acetate solution.

ALAN C. NIXON.
DAVID LOUIS YABROFF.

REFERENCES CITED

The following references are of record in the file of this patent:

UNITED STATES PATENTS

| Number | Name | Date |
|---|---|---|
| 2,152,722 | Yabroff et al. (B) | Apr. 4, 1939 |
| 2,229,995 | Yabroff et al. (A) | Jan. 28, 1941 |
| 2,281,347 | Blair | Apr. 28, 1942 |